United States Patent [19]
Beauregard

[11] 3,826,463
[45] July 30, 1974

[54] FLOW CONTROL VALVE
[75] Inventor: William W. Beauregard, Agawam, Mass.
[73] Assignee: Springfield Wire, Inc., Springfield, Mass.
[22] Filed: Apr. 26, 1973
[21] Appl. No.: 354,754

[52] U.S. Cl. .................................. 251/120, 138/45
[51] Int. Cl. ........................................... F16k 47/08
[58] Field of Search ..................... 138/45; 251/120

[56] References Cited
UNITED STATES PATENTS

| | | | |
|---|---|---|---|
| 2,454,929 | 11/1948 | Kempton | 138/45 |
| 2,489,542 | 11/1949 | Rosenblum | 251/120 X |
| 2,815,923 | 12/1957 | Clark | 251/120 |
| 2,888,237 | 5/1959 | Dahl | 251/120 |
| 2,891,578 | 6/1959 | Dahl et al. | 138/45 |
| 2,936,788 | 5/1960 | Dahl et al. | 138/45 |
| 2,941,544 | 6/1960 | Peras | 138/45 X |
| 3,121,445 | 2/1964 | Wisniewski | 138/45 |
| 3,141,477 | 7/1964 | Campbell et al. | 138/45 |
| 3,371,685 | 3/1968 | Tilney | 251/120 X |
| 3,480,040 | 11/1969 | Erickson | 251/120 X |

Primary Examiner—William R. Cline
Assistant Examiner—Gerald A. Michalsky
Attorney, Agent, or Firm—Chapin, Neal and Dempsey

[57] ABSTRACT

A flow control valve having a generally cylindrical, unitary resilient valve seat and flow control member having a toroidal lower, outer edge portion extending about the periphery thereof. The body of the valve has a conical valve surface such that the entire undersurface of said resilient control member, spans in spaced relation the entire conical surface when the control member is not flexed by fluid pressure. A recess is provided in the side wall of the valve body above the outer edge of the conical surfaces to receive the toroidal edge portion of the control member.

5 Claims, 3 Drawing Figures

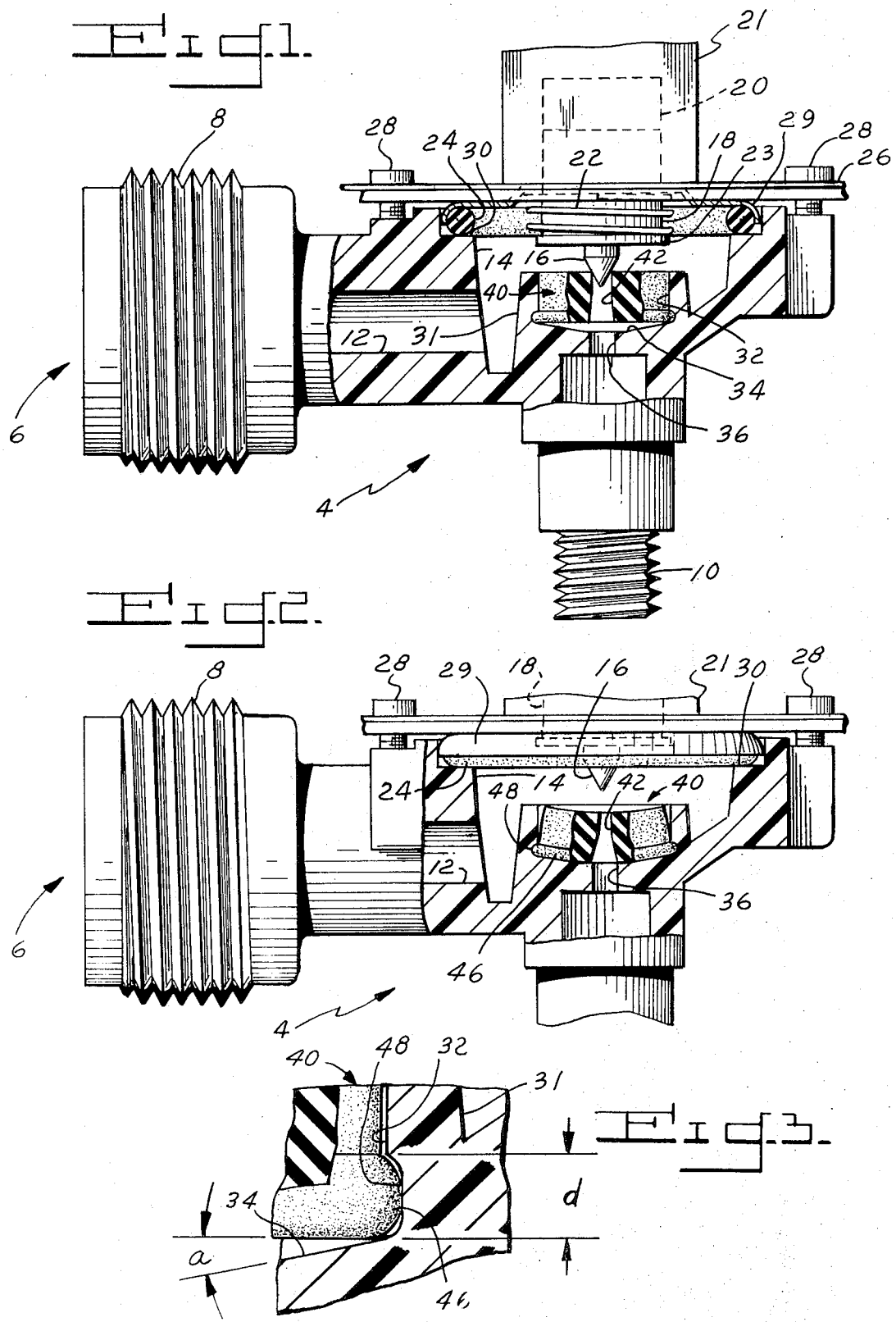

FLOW CONTROL VALVE

BACKGROUND

For some time fluid control valves having a combination resilient valve seat and flow control washer have been disclosed in the patent literature. Such devices, one of which is shown in the Clark U.S. Pat. No. 2,815,923, embody the idea of combining in a unitary elastic member the function of a valve seat washer and the function of a fluid flow control washer for maintaining constant flow. Such valves are useful in all types of appliances, such as automatic ice makers, which require a constant rate of flow despite variations in household water pressures which may vary from about 15 psi to 150 psi. Generally in the past such valves have included an annular shoulder on which the outer peripheral portion of the elastic control washer is seated. The sealing function of such dual functioning washers has been achieved by hydraulic pressure urging the washer against the annular shoulder and also by providing a close fit between the periphery of the washer and the surrounding valve body. While at low operating pressures a tight fit of the washer is essential to prevent leakage during valve "shut-off," it has been found that this arrangement tends to interfere with the flow controlling function of the washer.

For controlling the rate of flow, the portion of the washer adjacent its orifice has heretofore been unsupported so that it was capable of flexing into the outlet thereby restricting flow through the washer orifice as a function of upstream pressure variations. For water pressures on the high side of the usual household range, it has been found that these combination resilient washers are not suitable because of their tendency to extrude into the outlet and excessively reduce flow through the controlling orifice. In addition, there is a tendency of "wear" or "creep" of the elastic washer element, resulting from being sharply deformed for long time durations around the edge of the supporting shoulder. One proposed solution to the problem of extrusion during high pressure operation has been to provide a snap ring to encircle the elastic washer adjacent its upper outer edge and thereby limit inward radial distortion of the upper body portion of the element. This has not, however, overcome the leakage problem during "shut-off."

It is the principal object of the invention to provide a fluid flow control valve having a conical valve seat with combination unitary resilient flow control and valve shut-off washer disposed in spaced relation to the conical valve seat and which is constructed to minimize the problem of leakage during valve shut-off without adversely affecting the flow controlling characteristics of the washer.

Another object of this invention is to provide a combination resilient shut-off member and flow control washer of the above type which eliminates the need for a separate retaining ring.

A further object of this invention is to provide a resilient member of the above type for use in combination with a shoulderless frustoconical valve seat for reducing the problem of elastomer creep caused by washer deformation.

Yet another object is to provide a combination resilient member of the above type which minimizes the problem of the washer becoming unseated when subjected to vibration or shock during shipment and handling.

The above and other objects and advantages of this invention will be more readily apparent from the following description and with reference to the accompanying drawings, in which:

FIG. 1 is an elevational view partly in section showing one type of solenoid valve embodying this invention;

FIG. 2 is a view similar to FIG. 1 showing the components of the valve in different operative condition; and FIG. 3 is a view on an enlarged scale showing a portion of FIG. 1.

A fluid flow control valve is shown generally at 4 in the drawings and comprises a unitary body which may be molded of a suitable synthetic plastic, such as nylon or the like. The valve includes a tubular inlet 6 suitably threaded as at 8 for coupling to a water supply conduit. The valve portion also includes an outlet fitting 10 threaded for connection to any suitable appliance to which water is to be supplied at a constant rate of flow.

A bore 12 of the inlet portion 6 extends into a valve chamber 14 in which is located a valve closure member 16. The closure member is provided with a conical tip extending from a cylindrical armature 18 which is receiprocably fitted into a cup-shaped fluid tight housing 20. The housing includes a cylindrical portion which extends into a central recess in a coil-core group illustrated generally at 21 and an outwardly flared skirt portion 29 which carries an O-ring 24 adjacent its outer edge for sealing the upper end of the valve chamber 14. A coil spring 22 surrounds the armature 18 and has its lower end seated against a flange 23 and its upper end seated against the inner edge of the housing skirt. A bracket 26 is held in place by means of screws 28 which hold the skirt portion 29 of the cup-shaped housing in fluid sealing relationship with annular surface 30 formed at the open end of the valve chamber. A boss 31 extends into the valve chamber 14 and is provided with a generally cylindrical bore 32 which opens upwardly into the valve chamber at one end and at its other end joins an inwardly and downwardly sloping frustoconical surface 34. From the inner edge of the conical surface 34 an outlet passage 36 communicates with the valve outlet 10. The pitch $a$ of the conical surface 34 (FIG. 3) is preferably in the range of approximately 10° – 13° with the selection of any particular angle being related to the thickness, resilience and the orifice size of the washer 40.

The washer 40 is disposed within the bore 32 and serves as a combination valve seat for the conical tip 16 of the armature and means for maintaining constant flow therethrough. The washer is formed of a suitable elastomeric material such as neoprene and is provided with a central orifice 42. The upper and lower surfaces of the washer are generally flat and parallel to each other. The outer circumference of the washer is cylindrical except for a toroidal shaped retaining and sealing rim 46 formed adjacent its lower outer edge. The toroidal rim or ring shaped flange is adapted to be fitted snugly into an annular recess 48 (FIG. 3) formed around the lower end of cylindrical wall 32, while the cylindrical portion of the washer fits loosely in the valve body so that no inwardly directed radial distortions are projected to the upstream end portion of the washer where the major flow controlling function is accomplished. The sealing rim 46, shown somewhat flattened in FIG. 3, is of sufficient outer diameter for an "interference fit" with the inner surface of the recess 48 to provide sealing forces in line-sealing relation. When the valve is closed, as shown in FIG. 1, this line-sealing engagement at the downstream end of the washer provides maximum sealing efficiency with minimum resultant radial distortion at the controlling end of the washer orifice to prevent any leakage about the periphery of the washer. This is a very important feature, since with certain appliances, such as ice makers, leakage when the valve is shut off may result either in water overflowing the ice cube forming trays, if the leakage is substantial, or in freeze-up and blockage of the water supply conduit, when the leakage is small. The sealing achieved by this arrangement is relatively independent of upstream pressures on the resilient washer in marked contrast to previous designs of such dual functioning washers which depended primarily on upstream pressures and to some extent on a tight surface-to-surface fit between the entire outer periphery of the washer and the surrounding valve body to achieve sealing. At low operating pressures the pressure dependent seal tends to become inadequate and the tight peripheral surface fit tends to adversely affect the flow control characteristics of the washer.

In addition to sealing, rim 46 serves to retain the washer in assembled relation with the valve body once it has been fitted into recess 48 and minimizes any tendency for the washer to become unseated once assembled.

In the embodiment shown, the washer may have a thickness of about 0.125 – 0.250 of an inch and a durometer hardness of about 55 – 75 with an orifice diameter of about 0.03 – 0.10 inch. In the embodiment shown, the upper portion of the orifice 42 is cylindrical for about half the length of the orifice. Thereafter the orifice flares outwardly in the nature of a bell curve. As show at $d$ in FIG. 3, the sealing rim 46 has a diameter of about 0.050 inch.

In an unpressurized condition the undersurface of the resilient washer 40 spans in spaced relation the entire conical surface 34. The opening and closing of the valve is controlled by solenoid retraction and release of the armature 18 whereby the conical tip 16 either closes or opens the flow passage by engagement with the orifice 42 in the resilient washer 40. Any suitable electrical means may be provided to energize the coil-core group 21 to retract the armature 18, as shown in FIG. 2. When the coil is deenergized, spring 22 returns the conical tip 16 to its closed position, FIG. 1.

When the valve embodying this invention is subjected to variations in water pressure, the pressure acting on its upper surface delects the resilient washer 40 downwardly to varying degrees, depending upon the amount of pressure upstream of the washer. The greater the pressure, the greater will be the area of engagement, increasing from the washer rim, between the undersurface of the washer and the conical surface 34. The cross-sectional size of the orifice 42 will be proportionately reduced as the deflection of the washer increases. With this construction, constant fluid flow will be maintained at all times regardless of variations in the system pressure.

The flow control function of the washer is generally in two phases, i.e., in the lower pressure ranges below about 30 – 50 psi depending on the durometer of the rubber, and in the higher pressure ranges above about 40 – 50 psi. In the lower pressure ranges, control is achieved by washer deflection so that as pressures increase its undersurface will be deflected downwardly into increasing surface-to-surface engagement with the conical valve surface 34. At about 30 – 50 psi, when the entire underside of the washer is supported by the conical surface of the valve body as shown in FIG. 2, further increase in fluid pressure will cause compression of the washer and the orifice 42 further reduced in diameter in proportion to the amount the washer is compressed.

It will be noted in FIG. 2 that there is no tendency for the washer to be extruded into the outlet orifice and while the outer cylindrical surface of the washer is clear of the valve body, the ring 46 is in sealing engagement with the recess 46 to prevent leakage during valve shut-off.

Having thus described this invention, what is claimed is:

1. Fluid flow control valve comprising a valve body having a chamber with a downwardly pitched frusto-conical outlet surface, an integral resilient washer with a central orifice therethrough, said washer, when unstressed, having a surface thereof lying in a plane perpendicular to the axis of said orifice and spanning in spaced relation substantially the entire conical surface of said valve body, said washer including a generally toroidal shaped rim portion extending outwardly adjacent its lower edge, said rim portion having an interference fit with the valve body to provide line sealing engagement therebetween, and a closure member operable to open and close the orifice through said washer.

2. Fluid flow control valve as set forth in claim 1 in which at a predetermined fluid pressure upstream of the washer, the undersurface thereof is deflected into surface-to-surface engagement with the conical surface of the valve body, the diameter of the orifice being reduced as a function of the amount of deflection of the washer and above said predetermined pressure the diameter of the orifice being reduced as a function of the amount of compression of the resilient washer.

3. Fluid flow control valve as set forth in claim 1 in which said resilient material is an elastomer having a durometer hardness in the range 55 - 75 and in which the pitch of said conical surface is a vertical angle between said planar surface and conical surface in the range of 10° – 13°.

4. Fluid flow control valve comprising a valve body having a chamber with a frustoconical outlet surface leading therefrom, an integral resilient washer with a central orifice therethrough, a cylindrical outer surface and a circumferential generally toroidal rim extending outwardly of its lower, outer edge portion, said valve body including a generally cylindrical wall extending outwardly from the outer edge of said conical surface and having a recess therein to receive said rim, the cylindrical outer surface of the washer fitting loosely in said valve body and the rim having an interference fit in said recess to provide line-sealing engagement therebetween, said washer having a planar undersurface thereof lying in a plane perpendicular to the axis of said orifice and spanning entirely said conical surface in spaced relation thereto when the washer is unstressed and in substantially full surface-to-surface engagement therewith at a fluid pressure of above about 30 psi, and a closure member operable to open and close the orifice through said washer.

5. Fluid flow control valve as set forth in claim 4 in which the peripheral rim of said washer is of generally toroidal configuration, the outer surface thereof being engaged with the inner surface of the recess in the wall of said valve body and the amount of said surface-to-surface engagement between the washer and conical surface increases from the rim of the washer as the upstream pressure on the washer increases to about 30 psi, the fit of said rim in said recess being sufficient to return said washer in operative position relative to said frustoconical surface.

* * * * *